United States Patent [19]

Hamilton et al.

[11] Patent Number: 5,150,117
[45] Date of Patent: Sep. 22, 1992

[54] POWER MANAGEMENT SYMBOLOGY DISPLAY SYSTEM

[75] Inventors: Bruce E. Hamilton, Sandy Hook; Lorren Stiles, Roxbury; Howard P. Harper, Huntington, all of Conn.

[73] Assignee: United Technologies Corporation, Hartford, Conn.

[21] Appl. No.: 689,404

[22] Filed: Apr. 22, 1991

[51] Int. Cl.⁵ .............................................. G01C 23/00
[52] U.S. Cl. .................................. 340/973; 73/178 H; 340/946
[58] Field of Search ............... 340/945, 946, 971, 973, 340/705, 980; 73/178 H; 364/431.01; 244/17.11

[56] References Cited

U.S. PATENT DOCUMENTS

| | | | |
|---|---|---|---|
| 3,616,691 | 11/1971 | Brandau | 73/178 H |
| 4,305,057 | 12/1981 | Rolston | 340/705 |
| 4,439,157 | 3/1984 | Breglia et al. | 350/174 |
| 4,439,755 | 3/1984 | LaRussa | 340/980 |
| 4,446,480 | 5/1984 | Breglia et al. | 340/705 |
| 4,736,331 | 4/1988 | Lappos et al. | 73/178 H |
| 5,072,218 | 12/1991 | Spero et al. | 340/980 |

OTHER PUBLICATIONS

"Helmet Mounted Display System for Attack Helicopters", Walker et al. cl. 340–980, Society for Information Displays, Apr. 29, 1980.
Section 4–28 of TM 55-1520-238-10, "The Apache" (AH-64A), Helicopter Operator's Technical Manual, Jun. 28, 1984.

Primary Examiner—Jin F. Ng
Assistant Examiner—Brent A. Swarthout
Attorney, Agent, or Firm—Terrance J. Radke

[57] ABSTRACT

A power management symbology (PMS) display system for helicopters that provides a continually updated, combined analog/digital symbolic display of selected status information vis-a-vis the helicopter powerplant. The PMS display system includes a multi-dimensional, continuously updated, combined analog/digital display symbol that is optimized for discriminability and compatibility with respect to the pilot's visual system. The power management symbol includes a first dimension that is a static, analog representation of 120 percent nominal torque rating of the helicopter powerplant that functions as a referent, a second dimension that is a dynamic, analog representation of the maximum continuous power available from the powerplant, a third dimension that is a dynamic, analog representation of the power required to hover OGE, a fourth dimension that is a dynamic, digital/analog representation of the average instantaneous power being provided by the powerplant, and a fifth dimension that is an analog representation of a "torque split" condition of the powerplant that is only visible when the individual power outputs between the engines of the powerplant exceed a predetermined threshold differential. The PMS display system further includes a computer means, first and second sensor subsystems, a video display subsystem, and a sensing subsystem which, in combination, generate a synchronized video image of the power management symbol for the video display subsystem.

14 Claims, 4 Drawing Sheets

POWER MANAGEMENT SYMBOLOGY DISPLAY SYSTEM

RELATED APPLICATION

The present application is related to commonly-owned, co-pending U.S. patent application entitled HELICOPTER VIRTUAL IMAGE DISPLAY SYSTEM INCORPORATING STRUCTURAL OUTLINES and U.S. patent application Ser. No. 07/160,222, filed Feb. 24, 1988, entitled CONTACT-ANALOG HEADUP DISPLAY METHOD AND APPARATUS, now U.S. Pat. No. 5,072,218 and U.S. patent application Ser. No. 07/160,059, filed Feb. 24, 1988, entitled AIRCRAFT HELMET POINTING ANGLE DISPLAY SYMBOLOGY, now abandoned.

TECHNICAL FIELD

The present invention relates to aircraft status display systems, and more particularly, to a power management symbology display system that provides a continually updated, combined analog/digital symbolic display of selected status information vis-a-vis the powerplant of a dual engine helicopter.

BACKGROUND OF THE INVENTION

Future generation aircraft (including helicopters) now in planning and/or development phases (as well as many present generation aircraft) are complex systems comprised of a large number of interrelated, complex subsystems such as the airframe, powerplant, flight controls, avionics, navigation equipment, armament, etc. Such subsystems generate significant amounts of status data, much of which must be frequently monitored by the pilot for the safe and/or efficient operation and/or pilotage of the aircraft. A considerable portion of pilot workload in these future generation aircraft will be devoted to monitoring the status of the aircraft subsystems during flight operations via reference to the generated status data.

In addition, mission requirements for such future generation aircraft may involve a greater percentage of high pilot workload flight operations such as nap-of-the-earth (NOE), adverse weather, and/or night flying. Such high pilot workload flight operations require the pilot to maintain a continual spatial awareness of aircraft orientation and/or location with respect to the external world and a situational awareness of objects of interest in the external world vis-a-vis the aircraft in addition to continual monitoring of the status of aircraft subsystems.

It will be appreciated that the task of monitoring the status of the various aircraft subsystems may conflict with the tasks of maintaining continual spatial and situational awareness of the external world. To monitor the status of aircraft subsystems, the pilot may have to divert his attention from the observation of the external world outside the cockpit to reference generated status data. Such diversions may lead to losses, in varying degrees, of spatial and/or situational awareness of the external world, which, in turn, may lead to less than optimal flight conditions, especially during high pilot workload flight operations.

Current aircraft design methodology strives to optimize the interrelationship between the functional task of monitoring aircraft status information and the functional tasks of maintaining continual spatial and situational awareness of the external world vis-a-vis the aircraft. Such design methodology seeks systems and methods that allow vital aircraft status information to be accessible to the pilot in such a manner that there is no interference with the continual spatial and situational awareness functions being performed by the pilot. In addition, such aircraft status information should be presented in a manner consonant with the spatial orientation and perspective of the pilot to preclude any decoupling among the various functional tasks. Such decoupling may lead to increased pilot workload (to maintain a viable frame of reference) and/or to pilot disorientation.

Electro-optical systems have been developed to provide aircraft status information to the pilot to facilitate simultaneous accomplishment of both the status monitoring functions and the spatial and situational awareness functions. These systems generate symbolic and digital status information images that correspond to the aircraft status information generated by the various aircraft subsystems and superimpose such symbolic status information images into the pilot's field of vision. The images are typically introduced into the pilot's field of vision by means of collimated light rays so that the symbolic images appear to be at optical infinity with respect to the pilot's visual system.

Thus, the pilot views the external world outside of the cockpit at infinity and simultaneously sees symbolic and digital images at infinity. The superimposition of two sets of images, i.e., the external world and electronically generated symbolic and digital status information images, enable the pilot to simultaneously maintain awareness of the status of the aircraft, the spatial orientation of the aircraft with respect to the external world, and a situational awareness of the external world vis-a-vis the aircraft.

Exemplary prior art electro-optical systems utilizing collimated light rays to generate symbolic images include head-up display (HUD) subsystems and helmet mounted display (HMD) subsystems. Representative examples of HUD and HMD subsystems are illustrated in U.S. Pat. Nos. 4,446,480, 4,439,775, 4,439,157, 4,305,057, 4,269,476, and 3,923,370. While such electro-optical systems have contributed significantly to the optimization of the interrelationship between the functional task of monitoring aircraft status information and the functional tasks of maintaining continual spatial and situational awareness of the external world vis-a-vis the aircraft during both visual and non-visual flight conditions, it will be appreciated that the significant amounts of aircraft status information required by the pilot for the safe and/or efficient operation and/or pilotage of the helicopter give rise to a number of special problems vis-a-vis the display mechanics of such status information utilizing electro-optical display systems.

Aircraft status is continuously being monitored by a variety of sensors that are interfaced with various helicopter subsystems such as the airframe, powerplant, flight controls, avionics, navigation equipment, armament, etc. and which are operative to provide continuous streams of raw data regarding the status of such subsystems. In addition, other sensors monitor and provide streams of raw data regarding the status of the external world. Such raw data is continuously being analyzed and/or processed by various automated flight systems such as Flight Management Systems, Flight Directors, Autopilots, Stability Augmentation Systems, and Electronic Engine Control Systems which are operative to provide continuous streams of both raw and processed (either combined raw data or derived data based upon raw data) data representative of aircraft status information.

The initial problem encountered in designing an optimized information display system is data selection. That is, a determinative process must be undertaken to prioritize the raw and/or processed data on the basis of information required by the pilot for safe and/or efficient operation and/or pilotage of the aircraft in view of particular flight conditions and mission requirements. Such prioritization must take into account the "channel capacity" of the pilot, i.e., the upper limit as to the amount of information the pilot can effectively visually receive and process.

Once an initial prioritization has been made as to the raw and/or processed data that must be made available to the pilot through an electro-optical display system, the next problem is the optimization of visual coding of information (stimuli) that is presented via the display system. A variety of factors influence visual stimuli coding.

One factor is the number of visual stimuli to be presented versus the amount of display field available. Another factor is the organization of such stimuli vis-a-vis the display field. High priority stimuli should be centrally displayed on the display field while lower priority stimuli may be displayed nearer the edges of the display field. Stimuli discriminability, i.e., the perceivability of the stimuli by the pilot's visual system, must be considered as well as stimuli compatibility, i.e., the naturalness of the stimuli with respect to response expected from the pilot. Another factor to be considered is whether the stimuli represents dichotomous or non-dichotomous status information, i.e., representative of abnormal or normal conditions, respectively, and whether such status information should be available continuously, or, in the case of dichotomous information, when such status information reaches a threshold level wherein safe aircraft operation is affected. Still another factor is whether the stimuli is static or dynamic, and if dynamic, the frequency update interval.

Another important factor to consider is the nature of the stimuli utilized to convey status information, i.e., numerical, alphabetical, alphanumeric, and/or symbolic. Numerical, alphabetical, and alphanumeric stimuli are generally more advantageous for the visual presentation of quantitative and/or language status information. Symbolic stimuli (symbols), on the other hand, are generally more advantageously utilized where relative discriminations based upon quantitative status information are required. Symbols may be presented in one or more dimensions, and such dimensions may be discrete, continuous, and/or interrelated (combined), depending upon the nature of the status information discriminations required with respect thereto.

There exists a continuing need to re-evaluate and/or optimize the format of the status information symbology that is made available to the pilot via the display field of an electro-optical display system regarding aircraft status so that the status information symbology displayed to the pilot provides aircraft status information in a format that is optimized for absolute and relative informational content and perceptability.

SUMMARY OF THE INVENTION

A primary object of the present invention is to provide a power management symbology display system that provides powerplant status information to the pilot that is optimized for absolute and relative informational content and perceptability.

Another primary object of the present invention is to provide a power management symbol for the power management symbology display system that is operative to display selected powerplant status information to the pilot in a symbolic format that is optimized for discriminability and compatability with the pilot's visual system.

The power management symbology (PMS) display system of the present invention has utility for all aspects of helicopter flight operations, and particularly during non-visual flight conditions such as night and/or adverse weather flight operations. The power management symbol provided by the PMS display system of the present invention is a multi-dimensional, continuously updated, combined analog/digital symbol that provides the pilot with visual cues regarding selected powerplant status information. The power management symbol is optimized for discriminability and compatibility vis-a-vis the pilot's visual system. The power management symbol is further optimized to facilitate relative discriminations among the predetermined parameters of the selected powerplant status information represented by the power management symbol.

The power management symbol is operative to provide the pilot with continuous visual cues regarding the maximum continuous power available from the powerplant and the instantaneous power being provided by the powerplant to power the helicopter in view of the instantaneous collective setting. The power management symbol is further operative to provide the pilot with continuous visual cues regarding the power required to hover out of ground effect (OGE). The power management symbol is also designed to provide dichotomous visual cues during "torque split" engine conditions, i.e., the condition wherein individual torque outputs from each engine have exceeded a predetermined threshold differential.

The power management symbol of the present invention is a five-dimensional symbol that includes a first dimension, a second dimension, a third dimension, a fourth dimension represented by both numerical (digital) symbology and graphical (analog) symbology, and a fifth dimension.

The first dimension is a static, analog representation of the 120% nominal torque rating of the powerplant. The first dimension is an absolute dimension (constant magnitude, i.e., length) that functions as a referent for the other status information symbology comprising the power management symbol.

The second dimension is a dynamic, analog representation of the maximum continuous power available from the powerplant. The second dimension is a derived, relative dimension that is disposed and referenced in combination with the first dimension so as to provide the pilot with a readily perceptible visual cue regarding maximum continuous power available vis-a-vis the 120% nominal rating.

The third dimension is a dynamic, analog representation of the power required to hover OGE at the current flight altitude and helicopter weight. The third dimension is a derived, relative dimension representing the flight maneuver that requires the largest power output from the powerplant at the present flight conditions and which is disposed and referenced in combination with the second dimension so as to provide the pilot with a readily perceptible visual cue regarding power required to hover OGE vis-a-vis the maximum continuous power available.

The fourth dimension is a dynamic, digital and analog representation of the average instantaneous power being provided by the powerplant during the present flight condition, i.e., the power setting commanded by the pilot's collective input. The fourth dimension is a derived, relative dimension that is disposed and referenced in combination with the second dimension so as to provide the pilot with a readily perceptible visual cue regarding average power being utilized vis-a-vis the maximum power available. The fourth dimension is provided in both a digital and an analog format to provide the pilot with different visually perceptible cues as to average power being utilized vis-a-vis the second dimension referent.

The fifth dimension is a dynamic, analog representation of a "torque split" condition between the individual engines of the helicopter. The "torque split" condition is a dichotomous powerplant operating condition wherein the instantaneous power being provided by each engine exceeds a predetermined threshold differential. The fifth dimension is optimized to present relevant visual cues to the pilot regarding such a condition while simultaneously preventing pilot overload vis-a-vis the visual cues provided by the power management symbol. The fifth dimension is a dynamic, analog representation of the instantaneous power being provided by each engine. The fifth dimension is a continually updated, derived dimension (as discussed in further detail hereinbelow) that is visible only during a "torque split" condition wherein the fourth dimension is simultaneously blanked to prevent an overload of visual cues.

The power management symbol of the present invention provides the pilot with optimized, interrelated visual cues that facilitate the safe and/or efficient operation and/or pilotage of the helicopter. For example, as long as the power management symbol shows that the maximum continuous power available (second dimension) is greater than the power required to hover OGE (third dimension), the pilot will know that the helicopter will perform any desired maneuver since the hover OGE maneuver is the most power intensive flight maneuver. In addition, the instantaneous power being utilized (fourth dimension) effectively anticipates the delay between collective input and the actual engine power changes, thereby counterbalancing the loss of proprioceptive feedback resulting from the use of a modern side-arm controller.

In addition to the power management symbol described in the preceding paragraphs, the PMS display system according to the present invention includes a primary processing, interface, and control means that includes a symbology generator, a first sensor subsystem for monitoring helicopter subsystems, a second sensor subsystem for monitoring the external world vis-a-vis the helicopter, a video display subsystem, and a means for sensing the attitude and position of the video display subsystem with respect to a predetermined aircraft coordinate system. The foregoing elements of the PMS display system according to the present invention are operative to generate the raw and process status data required to generate the power management symbol, to generate a continuous video display of the power management symbol, and to transmit the power management symbol in a video format synchronized with the video display subsystem worn by the pilot to enable the pilot to monitor the status of the powerplant during both visual and non-visual flight conditions such as night and/or adverse weather flight operations in a consistent manner regardless of the spatial location and perspective of the pilot's visual system vis-a-vis the external world.

BRIEF DESCRIPTION OF THE DRAWINGS

A more complete understanding of the present invention and the attendant features and advantages thereof may be had by reference to the following detailed description when considered in conjunction with the accompanying drawings wherein.

DETAILED DESCRIPTION OF PREFERRED EMBODIMENTS

Figure 1:
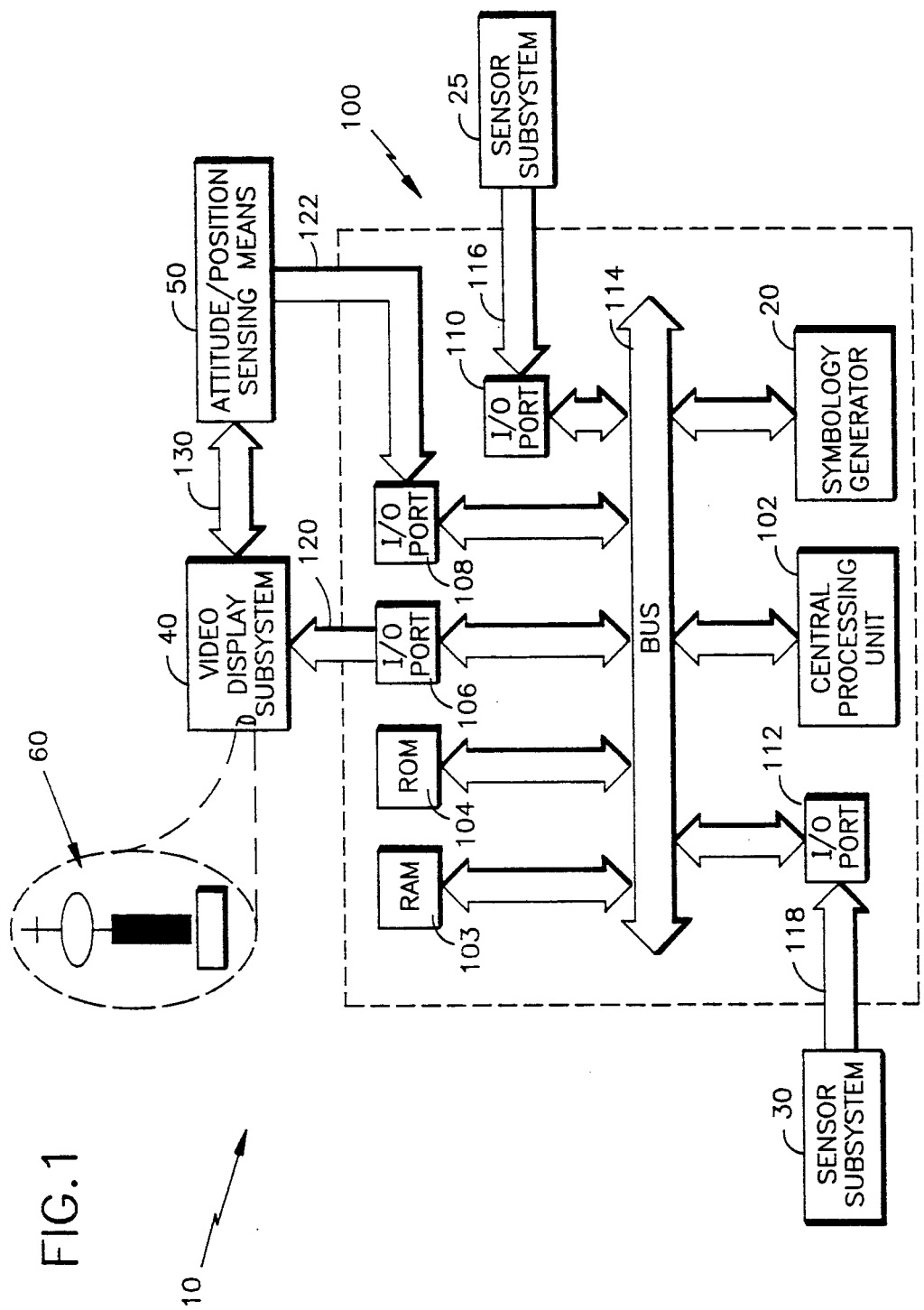
FIG. 1 is a schematic illustration of the power management symbology (PMS) display system according to the present invention.

Referring now to the drawings where like reference numerals identify corresponding or similar elements throughout the several views, FIG. 1 is a diagrammatic illustration of a power management symbology (PMS) display system 10 according to the present invention for helicopters. The PMS display system 10 of the present invention has utility for all aspects of helicopter flight operations, and particularly during non-visual flight conditions such as night and/or adverse weather flight operations. One such helicopter H embodying the PMS display system 10 is exemplarily illustrated in FIG. 2, which depicts the RAH-66 Comanche light helicopter. The RAH-66 helicopter H has a powerplant PP that includes a pair of engines E that provide individual power (torque) outputs that are subsequently combined to provide the combined power output that provides the lift and motive force for the helicopter H. While the PMS display system 10 of the present invention is described hereinbelow in terms of the RAH-66 helicopter, it is to be understood that the PMS display system 10 of the present invention may be utilized in other helicopters.

Figure 3:
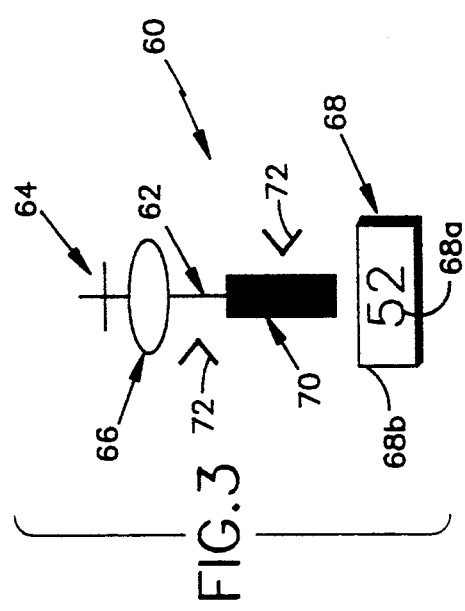
FIG. 3 is a plan view of a power management symbol for the PMS display system of the present invention.

The power management symbol 60 provided by the PMS display system 10 of the present invention is illustrated in FIG. 3. The power management symbol 60 is a multi-dimensional, continuously updated, combined analog/digital symbol that provides the pilot with visual cues regarding selected powerplant status information that is optimized for discriminability and compatibility vis-a-vis the pilot's visual system. The power management symbol 60 is further optimized to facilitate relative discriminations vis-a-vis predetermined parameters of the selected powerplant information represented by the power management symbol 60.

The power management symbol 60 is operative to provide the pilot with continuous visual cues regarding the maximum continuous power available from the powerplant PP and the instantaneous power being provided by the powerplant PP to power the helicopter H in view of the instantaneous collective setting. The power management symbol 60 is further operative to provide the pilot with continuous visual cues regarding the power required to hover out of ground effect (OGE). The power management symbol 60 is also designed to provide dichotomous visual cues during "torque split" engine conditions, i.e., the condition wherein individual torque outputs from each engine E have exceeded a predetermined threshold differential.

The power management symbol 60 of the present invention is a five-dimensional symbol that includes a first dimension 62, a second dimension 64, a third dimension 66, a fourth dimension represented by both numerical (digital) symbology 68 and graphical (analog) symbology 70, and a fifth dimension 72. As used herein in defining and describing the power management symbol 60, the term "dimension" refers to the various symbolic elements which, in combination, comprise the overall power management symbol 60 as illustrated in FIG. 3.

The first dimension 62 is a static, analog representation of the 120% nominal torque rating of the drivetrain of the powerplant PP. The powerplant PP of a given helicopter is designed to provide a predetermined rated torque (100%) based upon a nominal set of atmospheric conditions such as air temperature, pressure, altitude, and air moisture content (humidity). To provide such a predetermined rated torque, the drivetrain of the powerplant PP is overdesigned to a 120% torque rating to ensure that the predetermined rated torque (100%) is available for helicopter flight operations. The first dimension 62, therefore, is an absolute dimension (constant magnitude, i.e., length) that functions as a referent for the other status information symbology comprising the power management symbol 60 of the present invention, as described in subsequent paragraphs.

The second dimension 64 is a dynamic, analog representation of the maximum continuous power available from the powerplant PP. The second dimension 64 is a derived dimension (as discussed in further detail hereinbelow), based upon atmospheric conditions at a given flight altitude and the operating condition of the powerplant PP, that is continually updated during flight operations. The second dimension 64 is a relative dimension that is disposed and referenced in combination with the first dimension 62 so as to provide the pilot with a readily perceptible visual cue regarding maximum continuous power available vis-a-vis the 120% nominal rating.

The third dimension 66 is a dynamic, analog representation of the power required to hover OGE at the current flight altitude and helicopter weight. The third dimension 66 represents the flight maneuver that requires the largest power output from the powerplant PP at the present flight conditions. The third dimension 66 is a derived dimension (as discussed in further detail hereinbelow), based upon atmospheric conditions at the present flight altitude and the gross weight of the helicopter, that is continually updated during flight operations. The third dimension 66 is a relative dimension that is disposed in combination with the first dimension 62 and referenced in combination with the second dimension 64 so as to provide the pilot with a readily perceptible visual cue regarding power required to hover OGE vis-a-vis the maximum continuous power available.

The symbology representing the second and third dimensions 64, 66 are functionally interrelated inasmuch as the hover OGE maneuver can only be performed if the third dimension 66 is disposed below the second dimension 64, relative to the first dimension 62, as exemplarily illustrated in FIG. 3. The symbology for the second and third dimensions 64, 66, i.e., a straight line and a circle, ellipse, or ovoid, respectively, are optimized to provide visual cues that facilitate pattern recognition and relative discrimination between the second and third dimensions 64, 66 so as to reduce pilot workload in viewing, interpreting, and/or responding to the second and third dimensions 64, 66.

The fourth dimension 68, 70 is a dynamic, digital and analog representation of the average instantaneous power being provided by the powerplant PP during the present flight condition, i.e., the power setting commanded via the pilot's collective input. The fourth dimension 68, 70 is a derived dimension (as discussed in further detail hereinbelow), based upon power being provided by each engine E, such data being processed to provide the average power being utilized, and which is continually updated during flight operations. The fourth dimension 68, 70 is a relative dimension that is disposed in combination with the first dimension 62 and referenced in combination with the second dimension 64 so as to provide the pilot with a readily perceptible visual cue regarding average power being utilized vis-a-vis the maximum power available.

The fourth dimension 68, 70 is provided in both a digital and an analog format to provide the pilot with different visually perceptible cues as to average power being utilized vis-a-vis the second dimension 64 referent. The digital format of the fourth dimension 68 includes the magnitude of the average power being utilized in digital format 68a displayed within an open window format 68b. Human factors engineering studies indicate that the digital (numerical) format 68a facilitates quantitative information recognition and that the open window format 68b is the best presentation format for the visual perception of such quantitative information. The digital format 68 provides the pilot with an absolute visual cue as to average power being utilized.

The analog format of the fourth dimension 70, in contrast, provides the pilot with a relative visual cue as to average power being utilized vis-a-vis the second dimension referent 64. The analog format 70 is a dynamic bar dimension that is effectually superimposed upon the first dimension 62 (analagous to the "fluid" in a thermometer). The analog format facilitates relative discrimination between the average power being utilized and the maximum continuous power available, i.e., the second dimension 64.

The fifth dimension 72 is a dynamic, analog representation of a "torque split" condition between the individual engines E of the helicopter H. The "torque split" condition is a dichotomous powerplant PP operating condition wherein the instantaneous power being provided by each engine E exceeds a predetermined threshold differential. For the helicopter H described hereinabove, the predetermined threshold differential is 3 percent, i.e., the difference in magnitudes between the instantaneous power provided by each engine E is greater than three percent.

The fifth dimension 72 is optimized to present relevant visual cues to the pilot regarding such a condition while simultaneously preventing pilot overload vis-a-vis the visual cues provided overall by the power management symbol 60. The fifth dimension 72 is a dynamic, analog representation of the instantaneous power being provided by each engine E. The fifth dimension 72 is a continually updated, derived dimension (as discussed in further detail hereinbelow) that is visible only during a "torque split" condition.

The fifth dimension 72 comprises left and right "arrowheads", as exemplarily illustrated in FIG. 3, that are disposed in combination with the first dimension 62 and referenced in combination with the second dimension 64 to provide the pilot with readily perceptible visual cues regarding instantaneous power being provided by each engine (left and right engines E, respectively) vis-a-vis the maximum power available. Simultaneously with the display of the fifth dimension 72, the fourth dimension 68, 70 is blanked (display of the fourth dimension 68, 70 is temporarily suspended) to prevent an overload of visual cues. The status information derived from the fifth dimension 72 may be utilized by the pilot to restore the engines E to a normal operating condition and/or to shut down one of the engines E to prevent damage to the powerplant PP.

The power management symbol 60 of the present invention provides the pilot with optimized, interrelated visual cues that facilitate the safe and/or efficient operation and/or pilotage of the helicopter H. For example, as long as the power management symbol 60 shows that the maximum continuous power available (second dimension 64) is greater than the power required to hover OGE (third dimension 66), the pilot will know how the helicopter H will perform in power intensive flight maneuvers. In addition, the instantaneous power being utilized (fourth dimension 68, 70) effectively anticipates the delay between collective input and the actual engine E power changes, thereby counterbalancing the loss of proprioceptive feedback resulting from the use of a modern side-arm controller.

In addition to the power management symbol 60 described in the preceding paragraphs, the PMS display system 10 according to the present invention includes a primary processing, interface, and control (PPIC) means 100 that includes a symbology generator 20, a first sensor subsystem 25 for monitoring helicopter subsystems 25, a second sensor subsystem 30 for monitoring the external world vis-a-vis the helicopter H, a video display subsystem 40, and a means 50 for sensing the attitude and position of the video display subsystem 40 with respect to a predetermined aircraft coordinate system. The foregoing elements of the PMS display system 10 according to the present invention are operative to generate the raw and processed status data required for generation of the power management symbol 60, to generate the power management symbol 60, to generate a continuous video display of the power management symbol 60, and to transmit the power management symbol 60 in a synchronized video format to the pilot via the video display subsystem 40 for use in monitoring the status of the powerplant PP during both visual and non-visual flight conditions such as night and/or adverse weather flight operations.

The internal sensor subsystem 25 provides raw data representative of status information of the various functional subsystems of the helicopter H, and in particular, status data regarding the operation of the powerplant PP, and the instantaneous gross weight of the helicopter H, to the PPIC means 100. The external sensor subsystem 30 provides raw data representative of status information regarding the external world, for example, air temperature, pressure, humidity, altitude to the PPIC means 100.

Figure 4:
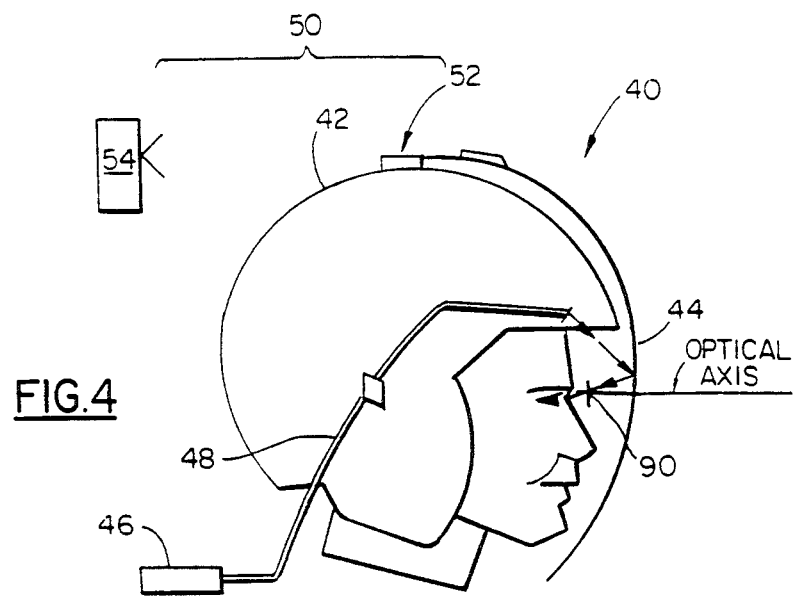
FIG. 4 is a plan view of a helmet mounted display system having utility in the PMS display system of the present invention.

The video image display subsystem 40 of the PMS display system 10 is operative to position the generated video image of the power management symbol 60 synchronized within the field of view of the visual system of the pilot. With reference to FIG. 4, the preferred video image display subsystem 40 is a helmet mounted display (HMD) subsystem that includes a helmet 42 and a visor type screen 44. The screen 44 may be fabricated as a reflective part of the optical train by utilizing a screen material that is partially reflective so that the screen 44 is operative to focus and project a collimated, synchronized video image of the power management symbol 60 onto the visual system of the pilot. Concomitantly, the screen 44 may be fabricated to be partially transparent to visible light radiation from the external world. The screen 44 is thus simultaneously operative to facilitate viewing of the external world via the pilot's visual system during visual flight conditions and to project collimated video images of the power management symbol 60 onto the pilot's visual system during both visual and non-visual flight conditions. The video image of the power management symbol 60 viewed by the pilot appears to be located at infinity due to the collimation provided by the HMD subsystem 40.

The visor type screen 44 may be removably attached to the helmet 42 so that the screen 44 may be removed for visual flight operations if desired. The screen 44 may be fabricated with a defined curved configuration to provide a 40°×60° degree panoramic field of view of the external world to the pilot (vertically and laterally, respectively, with respect to the optical axis of the pilot's visual system which is defined as a straight line projecting outwardly from the pilot's head from a point midway between his eyes).

The HMD subsystem 40 may be binocular and may include dual miniaturized cathode ray tubes (CRTs) 46 such as those manufactured by Thomas Electronics, Hughes Aircraft, or AT&T Bell Laboratories, that receive image signals from the primary processing, interface, and control means 100 and which are operative to generate high-definition video images therefrom. A one-inch diameter CRT 46 may provide 1200 video lines, i.e., a 1200×1200 pixel matrix. Associated with each CRT 46 is a collimating optical train 48 that provides the optical interface between the CRTs 46 and the screen 44 for the high-definition video images, the optical train 48 being operative to magnify and collimate the video images generated by the CRTs 46 for projection of video images onto the screen 44 for viewing by the pilot's visual system. The HMD subsystem 40 may be operative to generate overlapping video images such that the pilot perceives a unitary, panoramic, high-definition video pictorial representation of the external world via the screen 44. HMD subsystems 40 having utility in the PMG display system 10 of the present invention are generally known to those skilled in the art. A representative example of a HMD subsystem is described in U.S. Pat. No. Re 28,847.

Associated with the helmet 42 of the HMD subsystem 40 is a sensing means 50 that is operative to define the spatial position and angular orientation of the HMD subsystem 40 within the cockpit of the helicopter H. As exemplarily illustrated in FIG. 4, the helmet sensing means 50 comprises a sensor 52 mounted in combination with the helmet 42 and an electromagnetic radiator 54 mounted in the cockpit adjacent the helmet 42. The sensor 52 is responsive to constant field strength electromagnetic radiation emitted by the electromagnetic radiator 54 to generate position/orientation signals, corresponding to the position and angular orientation of the HMD subsystem 40 in the cockpit, based upon the field strength and phase of the intercepted electromagnetic radiation. These position/orientation signals are coupled to the PPIC means 100 which is operative to process such signals to identify the position and angular orientation (perspective) of HMD subsystem 40 in relation to the cockpit. Helmet sensing means 50 having utility in the PMS display system 10 of the present invention are generally known to those skilled in the art, such sensing means being exemplarily illustrated by the three-axis Polhemus systems that provide signals indicative of the angular orientation of the helmet 42 in three axes as described in U.S. Pat. Nos. 4,017,858 and 3,983,474.

Figure 2:
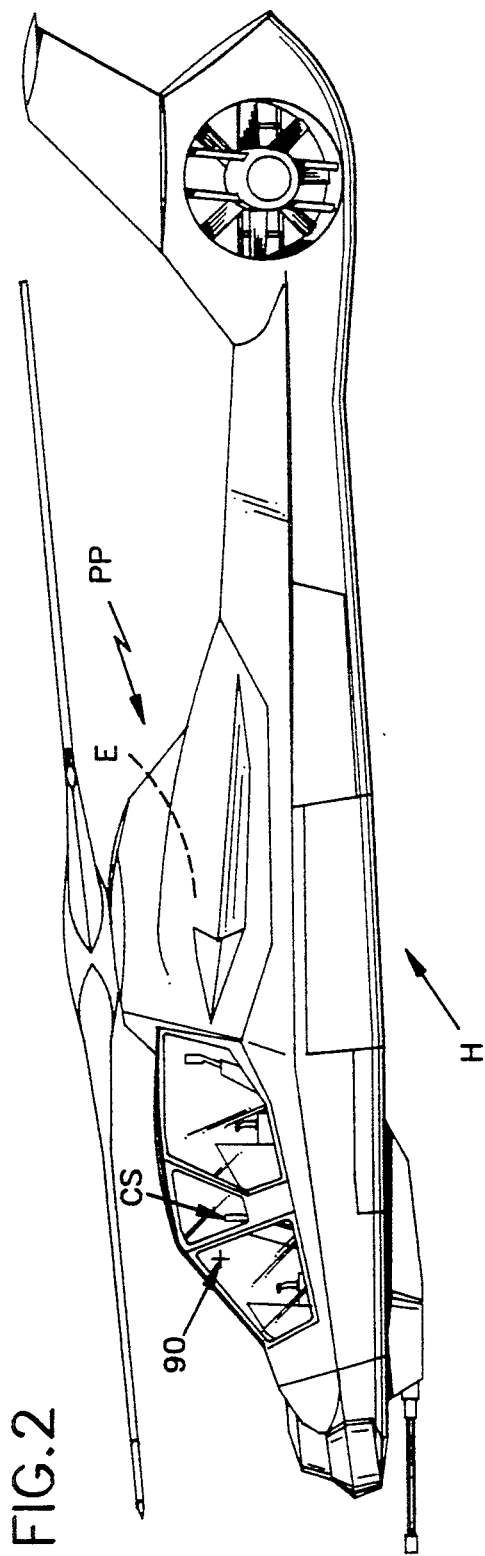
FIG. 2 is a plan view of a helicopter in which the PMS display system of the present invention may be used.

An imaginary reference point 90, designated as the "design eyepoint", is defined in the cockpit of the helicopter H illustrated in FIG. 2 (imaginary in sense that the design eyepoint 90 does not coincide with any structural elements or equipment comprising the canopy structure). The design eyepoint 90 is a design parameter that defines the degree of visibility (unimpaired visual field of view of the external world) provided to the pilot of the helicopter H based upon the structural configuration of the canopy structure. By way of example, for military helicopters having a single/tandem cockpit configuration, MIL-STD-850B sets forth suggested visibility requirements for the canopy structure.

For flight operations, the pilot positions himself in the cockpit seat CS (see FIG. 2) and adjusts the cockpit seat CS so that the origin of the optical axis of his visual system coincides with the design eyepoint 90 as illustrated in FIG. 4. To facilitate this alignment process, the RAH-66 helicopter H includes a boresight reticle unit mounted on the cockpit dashboard (coincident with the medial plane of the cockpit) and positioned so that, when activated, collimated light is emitted that passes through the design eyepoint 90. Only when the pilot is properly positioned in the cockpit, i.e., the origin of the optical axis of his visual system is coincident with the design eyepoint 90, will this collimated light be perceptible to the pilot's visual system.

Figure 5A:
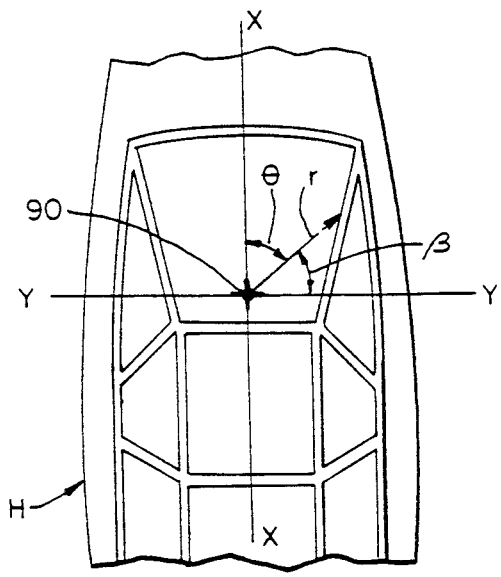
FIGS. 5A, 5B illustrate a polar coordinate system as a reference system for the PMS display system of the present invention.
Figure 5B:
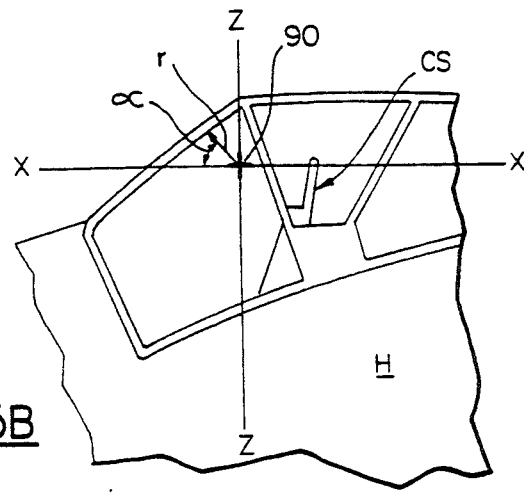

The design eyepoint 90 defines an origin (0, 0, 0) of a coordinate system for the PMS display system 10 of the present invention. To facilitate the identification and description of the spatial location and perspective of the HMD subsystem 40 by means of the PPIC means 100, a polar coordinate system (r, $\theta$, $\beta$, $\alpha$), as exemplarily illustrated in the plan views of FIGS. 5A, 5B, which are overlaid on the corresponding cockpit configuration of the helicopter H, is utilized to define the spatial location and perspective of the HMD subsystem 40 with respect to the cockpit of the helicopter H. Also illustrated in FIGS. 5A, 5B is the three axes coordinate system generally used for helicopter descriptive purposes, i.e., the longitudinal axis X—X, the transverse axis Y—Y, and the vertical axis Z—Z. As described hereinbelow in further detail, the polar coordinate system may be used to define any point (x, y, z) of the cockpit by means of the transformation equations:

$$x = r(\cos\theta)$$

$$y = r(\cos\beta)$$

$$z = r(\cos\alpha)$$

$$r^2 = x^2 + y^2 + z^2.$$

Identifying the spatial location and perspective of the HMD subsystem 40 is generally simplified by use of the polar coordinate system. As a general rule, once a pilot is properly positioned in the cockpit seat CS, as described hereinabove, the majority of head movements (which directly correspond to HMD subsystem 40 movements) naturally made by the pilot during typical flight operations consist of head rotations about the vertical axis Z—Z (left-right head turning movements), head rotations about the lateral axis Y—Y (up-down head movements), or combinations thereof. The foregoing head movements define the spatial perspective of the HMD subsystem 40, i.e., the pointing angles of the optical axis of the pilot's visual system (which may be defined by the radius vector of the polar coordinate system), which may be described in terms of the angle $\theta$, the angle $\alpha$, or combinations thereof, respectively, of the polar coordinate system.

Experience has shown that there will be relatively little translational movement of the pilot's head along the longitudinal, lateral, and/or vertical axes during normal flight operations. Pragmatically, therefore, the HMD subsystem 40 may be defined as having a constant spatial location coincident with the origin of the polar coordinate system. Even if the HMD subsystem 40 is subjected to translational movements, such movements may be accommodated and identified utilizing the processing capability of the primary processing, interface, and control means 100 inasmuch as such movements involve computations based upon relatively straightforward geometric relationships.

The initialized spatial location and perspective of the HMD subsystem 40 is defined in terms of the design eyepoint 90 and the optical axis of the pilot's visual system. The initialized spatial location of the HMD subsystem 40 is defined as the design eyepoint 90, i.e., the origin of the polar coordinate system. The initialized spatial perspective of the HMD subsystem 40 is defined so that the optical axis of the pilot's visual system is coaxial with the longitudinal axis X—X passing through the design eyepoint 90 and medially through the forward portion of the cockpit canopy. The helmet sensing means 50 is initialized to the foregoing initialized spatial location and perspective of the HMD subsystem 40. Subsequent movements of the HMD subsystem 40 are detected by the helmet sensing means 50, and defined and described in terms of the direction angles $\theta$, $\alpha$ (or the radius vector r and the direction angle $\beta$, as required) utilizing the processing capability of the PPIC means 100.

The PPIC means 100 of the PMS display system 10 is exemplarily illustrated in FIG. 1. The PPIC means 100 exemplarily illustrated includes a central processing unit 102, a random access memory (RAM) 103, a read only memory (ROM) 104, input/output ports 106, 108, 110, 112, a control, address, and data bus 114, and a symbol generator 20. The PPIC means 100 is illustrated in generalized form as a general purpose computer that may take on forms different than that specifically illustrated.

The computer architecture may be of the split processor type having more than one control, address, and data bus. One bus may be dedicated to input/output tasks and communication functions. Another separate bus may be dedicated to data processing, definition and synchronization functions, and generation of the power management symbol 60 and conversion of the symbol 60 to a synchronized video format. For architecture employing more than a single bus, each bus would typically have a processor such as a Motorola 80286 type processor associated therewith. The PPIC means 100 may be implemented in the form of Very High-Speed Integrated Circuitry (VHSIC) with 1.25 microns between geometric features. Such a PPIC means 100 may have more than 13 megabytes of internal memory, and the capability of executing 19 million instructions per second and 300+ million operations per second.

The PPIC means 100 is operative to provide electronic interfacing among the various subsystems comprising the PMS display system 10 as described hereinabove, via signal lines 116, 118, 120, 122, respectively. Interactive coupling between the HMD subsystem 40 and the helmet sensing means 50 is identified by reference numeral 130.

The PPIC means 100 is operative to process raw status data provided by the internal and external sensor systems 25, 30 via signal lines 116, 118, respectively, to derive processed data representative of the predetermined operating parameters of the powerplant PP as discussed hereinabove, i.e., the maximum continuous power available from the powerplant PP, the instantaneous power being provided by the powerplant PP, the power required to hover OGE, and the "torque split" condition. The PPIC means 100 is further operative to utilize such processed data to generate, by means of the symbol 60 generator 20, the power management symbol of the present invention.

The PPIC means 100 is further operative to transform the power management symbol 60 into a synchronized video format and to provide corresponding signals thereof to the HMD subsystem 40, via signal line 120. The PPIC means 100 is also operative to define the spatial orientation and perspective of the HMD subsystem 40 based upon position/orientation signals provided by the helmet sensing means 50 via signal line 122. The PPIC means 100 is also operative to correlate the defined spatial orientation and perspective of the HMD subsystem 40 for generation of the synchronized video image of the power management symbol 60 so that the video display of the power management symbol 60 is displayed within the field of view of the pilot's visual system at a predetermined, constant location, regardless of the spatial location and perspective of the HMD subsystem 40.

Figure 6:
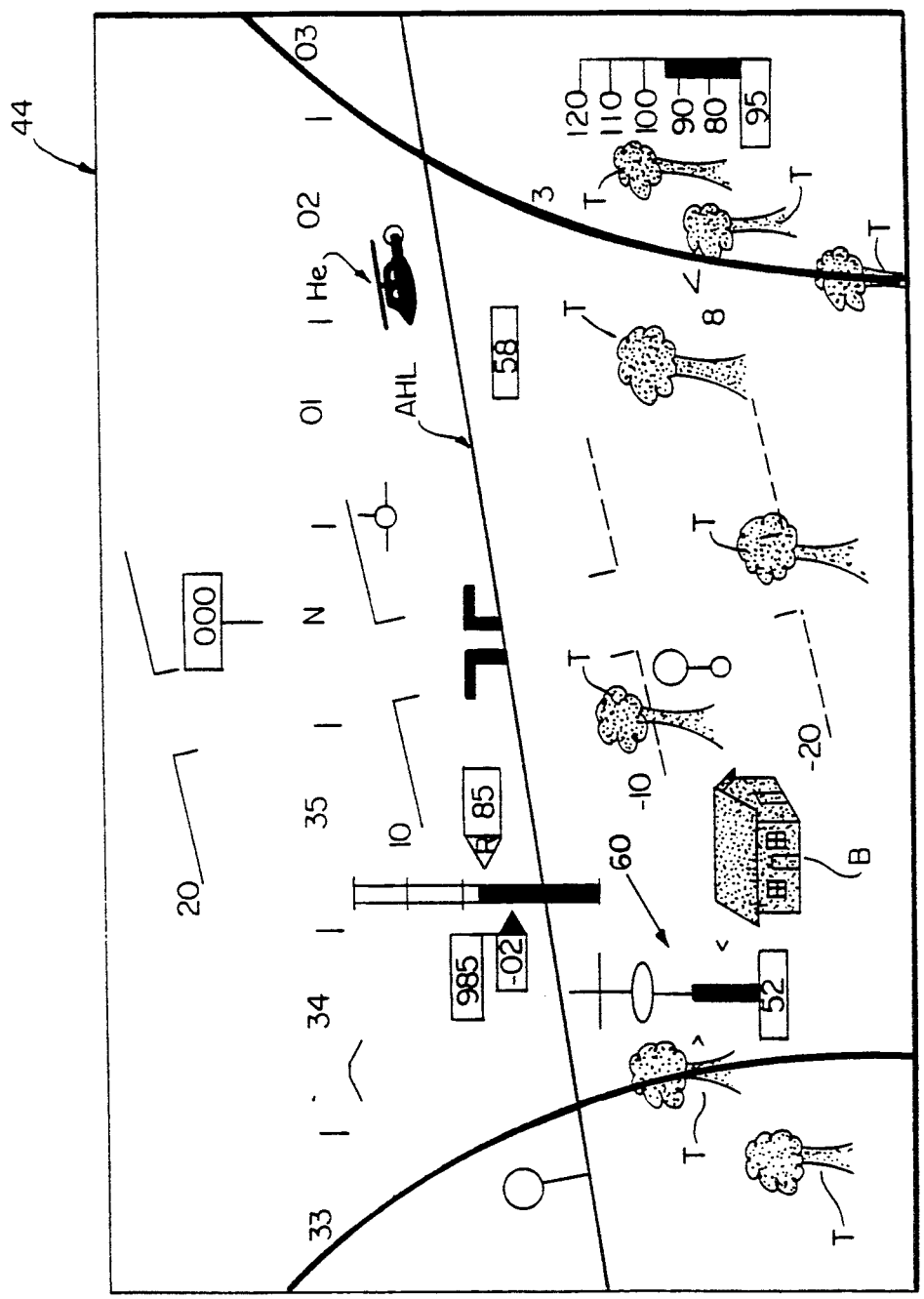
FIG. 6 is a plan view of the power management symbol of FIG. 3 superimposed upon the field of view of the pilot's visual system.

FIG. 6 is a pictorial representation of an instantaneous video image generated by means of the PMS display system 10 of the present invention. This pictorial representation is viewed by the pilot by means of the HMD subsystem 40 and utilized by the pilot to monitor the status of the powerplant PP while simultaneously maintaining spatial and situational awareness of the external world vis-a-vis the helicopter H. The pictorial representation of FIG. 6 illustrates the synchronized video image of the power management symbol 60 superimposed upon the pilot's field of view (either a real or virtual image of the external world as represented by a helicopter He in flight, trees T, and a building B) at a predetermined, constant location (in this case the lower left hand portion of the pilot's field of view. Other symbology illustrated in FIG. 7 is representative of aircraft status information that is not pertinent to the present invention.

A variety of modifications and variations of the present invention are possible in light of the above teachings. It is therefore to be understood that, within the scope of the appended claims, the present invention may be practiced otherwise than as specifically described hereinabove.

What is claimed is:

1. A power management symbology display system for a helicopter having a powerplant that includes two engines designed to provide a predetermined rate torque based upon a nominal set of atmospheric conditions, comprising:

a video display subsystem;

sensing means disposed in interactive relation with said video display subsystem for generating signals corresponding to the spatial location and perspective of said video display subsystem;

sensor means for generating raw data representing status information regarding the powerplant of the helicopter and the external world; and computer processing means for defining the spatial location and perspective of said video display means based upon said signals generated by said sensing means, said computer processing means being operative to generate a multi-dimensional, combined analog/digital power management symbol that provides visual cues regarding the status of the powerplant, said power management symbol being optimized for discriminability and compatibility with a pilot's visual system, said power management symbol including first dimension means for providing a static, analog symbolic representation of a nominal torque rating of the drivetrain of the powerplant based upon the predetermined rate torque, said first dimension means having a constant magnitude greater than the predetermined rated torque wherein said first dimension means functions as a referent for said power management symbol, second dimension means for providing a single dynamic, analog symbolic representation of maximum continuous power available from the powerplant, said second dimension means being disposed in combination with said first dimension means and referenced with respect thereto to provide a readily perceptible visual cue of maximum continuous power available vis-a-vis said nominal torque rating, third dimension means for providing a single dynamic, analog symbolic representation of power required to hover out of ground effect, said third dimension means being disposed in combination with said first dimension means and referenced with respect to said second dimension means to provide a readily perceptible visual cue regarding power required to hover out of ground effect vis-a-vis said maximum continuous power available, fourth dimension means for providing a single dynamic analog representation and a digital symbolic representation of instantaneous average power provided by the powerplant, said single analog symbolic representation provided by said fourth dimension means being superimposed upon said first dimension means and referenced in combination with said second dimension means to provide a readily perceptible visual cue regarding average power being utilized vis-a-vis said maximum power available, and fifth dimension means for providing a dynamic, analog symbolic representation of a torque split operating condition in the powerplant, said fifth dimension means being disposed in combination with said first dimension means and referenced in combination with said second dimension means to provide readily perceptible visual cues regarding instantaneous power being provided by each of the two engines only when instantaneous power being provided by each of the two engine exceeds a predetermined threshold differential;

wherein said first, second, and third dimension means and one of said fourth and fifth dimension means are simultaneously displayed in combination to form said multi-dimensional, combined analog/digital power management symbol;

and wherein said computer processing means is further operative to generate said power management symbol in a synchronized video format for display via said video display subsystem.

2. The power management symbology display system of claim 1 wherein:

said first, second, third, and fourth dimension means are simultaneously displayed in combination to comprise said power management symbol during normal operating conditions of the powerplant; and further wherein said first, second, third, and fifth dimension means are simultaneously displayed in combination to comprise said power management symbol during dichotomous operating conditions of the powerplant only when instantaneous power being provided by each of the two engines exceeds said predetermined threshold differential which simultaneously causes said fifth dimension means to be displayed and said fourth dimension means to be blanked.

3. The power management symbology display system of claim 2 wherein said predetermined threshold differential is about three percent.

4. The power management symbology display system of claim 1 wherein:

said first dimension means comprises a first bar;

said second dimension means comprises a second bar disposed in transverse combination with respect to said first bar;

said third dimension means comprises a closed curvilinear geometric figure disposed in transverse combination with said first bar; and said single analog symbolic representation of said fourth dimension means comprises a third bar superimposed in combination with said first bar.

5. The power management symbology display system of claim 4 wherein said closed curvilinear geometric figure is a figure selected from a group comprising a circle, an ellipse, and an ovoid.

6. The power management symbology display system of claim 4 wherein said fifth dimension means comprises first and second arrowheads disposed on opposite sides of said first bar.

7. The power management symbology display system of claim 1 wherein said digital symbolic representation of said fourth dimension means comprises a digital numeric and an open window, said digital numeric being displayed within said open window.

8. A multi-dimensional, combined analog/digital power management symbol for a helicopter video display subsystem, the helicopter including a powerplant having two engines designed to provide a predetermined rated torque based upon a nominal set of operating conditions, a sensing subsystem for generating raw data representing status information regarding the powerplant and the external world, and a computer subsystem including a symbology generator for processing the raw data, and utilizing the processed data to generate and display said multi-dimensional combined analog/digital power management symbol, comprising:

first dimension means for providing a static, analog symbolic representation of a nominal torque rating of the drivetrain of the powerplant based upon the predetermined rated torque, said first dimension means having a constant magnitude greater than the predetermined rated torque wherein said first dimension means functions as a reference for said power management symbol;

second dimension means for providing a single dynamic, analog symbolic representation of maximum continuous power available from the powerplant, said second dimension means being disposed in combination with said first dimension means and referenced with respect thereto to provide a readily perceptible visual cue of maximum continuous power available vis-a-vis said nominal torque rating;

third dimension means for providing a single dynamic, analog symbolic representation of power required to hover out of ground effect, said third dimension means being disposed in combination with said first dimension means and referenced with respect to said second dimension means to provide a readily perceptible visual cue regarding power required to hover out of ground effect vis-a-vis said maximum continuous power available;

fourth dimension means for providing a single dynamic analog representation and a digital symbolic representation of instantaneous average power provided by the powerplant, said single analog symbolic representation provided by said fourth dimension means being superimposed upon said first dimension means and referenced in combination with said second dimension means to provide a readily perceptible visual cue regarding average power being utilized vis-a-vis said maximum power available; and fifth dimension means for providing a dynamic, analog symbolic representation of a torque split operating condition in the powerplant, said fifth dimension means being disposed in combination with said first dimension means and referenced in combination with said second dimension means to provide readily perceptible visual cues regarding instantaneous power being provided by each of the two engines only when instantaneous power being provided by each of the two engines exceeds a predetermined threshold differential;

wherein said first, second, and third dimension means and one of said fourth and fifth dimension means are simultaneously displayed in combination to form said multi-dimensional, combined analog/digital power management symbol;

and wherein said computer subsystem is further operative to generate said power management symbol in a synchronized video format display via said video display subsystem.

9. The multi-dimensional, combined analog/digital power management symbol of claim 8 wherein:
said first, second, third, and fourth dimension means are simultaneously displayed in combination to comprise said power management symbol during normal operating conditions of the powerplant; and further wherein
said first, second, third, and fifth dimension means are simultaneously displayed in combination to comprise said power management symbol during dichotomous operating conditions of the powerplant only when instantaneous power being provided by each of the two engines exceeds said predetermined threshold differential which simultaneously causes said fifth dimension means to be displayed and said fourth dimension means to be blanked.

10. The multi-dimensional, combined analog/digital power management symbol of claim 9 wherein said predetermined threshold differential is about three percent.

11. The multi-dimensional, combined analog/digital power management symbol of claim 8 wherein:
said first dimension means comprises a first bar;
said second dimension means comprises a second bar disposed in transverse combination with respect to said first bar;
said third dimension means comprises a closed curvilinear geometric figure disposed in transverse combination with said first bar; and
said single analog symbolic representation of said fourth dimension means comprises a third bar superimposed in combination with said first bar.

12. The multi-dimensional, combined analog/digital power management symbol of claim 11 wherein said closed curvilinear geometric figure is a figure selected from a group comprising a circle, an ellipse, and an ovoid.

13. The multi-dimensional, combined analog/digital power management symbol of claim 11 wherein said fifth dimension means comprises first and second arrowheads disposed on opposite sides of said first bar.

14. The multi-dimensional, combined analog/digital power management symbol of claim 8 wherein said digital symbolic representation of said fourth dimension means comprises a digital numeric and an open window, said digital numeric being displayed within said open window.

* * * * *